United States Patent [19]

Korpman

[11] 4,325,770

[45] Apr. 20, 1982

[54] PROCESS FOR PRESSURE-SENSITIVE ADHESIVE COATED PRODUCTS

[75] Inventor: Ralf Korpman, Bridgewater, N.J.

[73] Assignee: Permacel, New Brunswick, N.J.

[21] Appl. No.: 163,606

[22] Filed: Jun. 27, 1980

[51] Int. Cl.³ .............................................. B41M 3/12
[52] U.S. Cl. .................................. 156/230; 156/283; 156/334; 427/146; 427/195; 427/201; 427/208.4; 427/208.6; 525/92; 525/93; 525/97; 525/98; 525/99; 524/274; 524/505; 524/534
[58] Field of Search .................. 260/27 B; 525/92, 93, 525/97, 98, 99; 427/195, 201, 208.4, 208.6, 146; 156/230, 283, 334

[56] References Cited

U.S. PATENT DOCUMENTS

| | | | |
|---|---|---|---|
| 3,232,813 | 2/1963 | Newton | 156/320 |
| 3,432,372 | 3/1969 | Avot | 156/151 |
| 3,573,128 | 3/1971 | Kettler et al. | 156/238 |
| 4,025,990 | 5/1977 | Lovette | 241/14 |
| 4,028,292 | 6/1977 | Korpman | 525/92 |
| 4,171,056 | 10/1979 | Hannon et al. | 427/195 |

OTHER PUBLICATIONS

R-20: New Recycling Technology for the 1980's, R. A. Swor et al., Rubber World, Jun. 1980, pp. 30-32.
Cryogenic Grinding: An Efficient Method for Recycling Scrap Rubber, Rubber World, Jun. 1980, pp. 33-34.

*Primary Examiner*—Shrive P. Beck
*Attorney, Agent, or Firm*—Alice O. Robertson

[57] ABSTRACT

A process for making a pressure-sensitive adhesive coated product from an elastomer utilizing dry blending of powders and dry coating steps is described. Compositions suitable for use in this process are also described.

6 Claims, No Drawings

PROCESS FOR PRESSURE-SENSITIVE ADHESIVE COATED PRODUCTS

The present invention is directed to a process for preparing pressure-sensitive adhesives, particularly for preparing pressure-sensitive adhesive coated products from powdered compositions of elastomer and tackifying resin.

BACKGROUND OF THE INVENTION

There are two classes of pressure-sensitive adhesives, those in which the adhesive composition is a combination of an elastomer and a tackifier, i.e., a tackifying resin and those in which the adhesive composition is an acrylate in which both the adhesive strength and tack are provided by the acrylate polymer. The former is much preferred as an industrial pressure-sensitive adhesive in having superior adhesive characteristics.

In the manufacture of pressure-sensitive adhesive products in which the adhesive is of the class which employs a combination of elastomer plus tackifier, the adhesive components are intimately mixed, either in a solvent or under heat and pressure employing equipment such as a Banbury mixer, mill or extruder. The adhesive mixture then is applied onto a substrate or backing. The usual methods for accomplishing the application are solvent coating, calendering, hot melt coating, and extruding.

Solvent coating is undesirable for several reasons. It may be expensive and/or wasteful. Formerly, the spent solvent was exhausted to the atmosphere. This was both wasteful and pollution producing. To avoid pollution, afterburners or solvent recovery systems are employed. The use of afterburners does not avoid waste and the use of solvent recovery systems is quite expensive.

The solvent-free methods, i.e., calendering, hot-melt coating, extruding, usually require one or more heavy duty equipment which is expensive to install and to operate. The calendering method, in addition, is not adaptable for preparing thin adhesive layers.

A coating method known in the non-adhesive art is the application of powder to a substrate surface, heating to fuse the particles to a molten condition and cooling to obtain a film coating. This has been carried out successfully with a single-component non-adhesive powder such as polyethylene. This procedure would be desirable for preparing pressure-sensitive adhesive coatings because it is adaptable to conventional ovens, is less costly, and is applicable in either light or heavy weight coatings. Although non-pressure-sensitive adhesives have been applied to substrate as powders, these have been hot melt adhesives in which bonding is carried out while the adhesive is in the fused state. These procedures do not require formation of a smooth film coating on cooling. Smooth pressure-sensitive adhesive coatings have not heretofore been found to be obtainable from a mixture of elastomer and tackifier employing the powder method. While U.S. Pat. No. 3,573,128 describes an apparatus and method for pressure-sensitive adhesive tapes, there is no teaching or example indicating the chemical nature of the material or materials which may be employed.

It is an object of the present invention to find a suitable means for successfully adapting the powder film forming method for the preparation of pressure-sensitive adhesive tapes.

DESCRIPTION OF THE INVENTION

According to the present invention, a method has been discovered which enables pressure-sensitive adhesives of the type obtained from an elastomer and tackifier combination to be prepared by a powder method which avoids the use of solvents and heavy duty equipment. The method comprises cooling a thermoplastic rubber as hereinafter defined to a temperature below about minus 20° C., pulverizing the thermoplastic rubber to obtain an elastomer powder, dry blending the elastomer powder thus obtained with tackifier powder, applying the blend to a substrate, subjecting the dry coated substrate to temperatures sufficient to melt the components and thereafter allowing to cool to obtain a smooth pressure-sensitive adhesive coated substrate.

The present invention is advantageous in not only providing a method for facilely preparing the preferred pressure-sensitive adhesives derived from elastomer-tackifier combination in a solvent-free operation and without the need for heavy duty equipment, but is also advantageous in providing a superior method for applying pressure-sensitive adhesives to surfaces with irregularly shaped boundaries, and to irregularly shaped articles.

In the process of the present invention the elastomer component comprising a highly thermoplastic elastomer as hereinafter defined is first cooled to below at least about minus 20° C., preferably below minus 50° C. by any suitable means. It is preferably accomplished by placing the thermoplastic elastomer which is normally available as rubbery particles or crumbs varying in size from about 0.5 to 4 centimeters in cross section into contact with a cryogenic fluid such as liquid nitrogen, liquid air, liquid helium or liquid methane, although other suitable chilling techniques may be employed. The cooled particles are then comminuted to a particle size small enough to pass through a 60 mesh screen (cross section no greater than about 250$\mu$). It is critical and essential that the thermoplastic elastomer be of very small particle size to successfully accomplish the subsequent fluxing step. Any standard comminuting device may be employed. The cooling and comminuting steps are most conveniently carried out in a substantially single operation, i.e., placing the thermoplastic elastomer into a cryogenic fluid, preferably liquid nitrogen, contained in an apparatus fitted with a comminuting device such as a dicer, and carrying out the comminuting or dicing operation until the elastomer is of the appropriate size. The pulverulent elastomer thereafter is recovered from the cryogenic fluid. Alternatively, a cryogenic fluid may be sprayed onto elastomer particles to freeze the particles and the frozen particles then comminuted. The elastomer powder will remain as a powder at room temperature but a separating agent such as starch derivative, silicic acid, aluminum hydrate and the like may be advantageously employed to assure retention in easily flowable pulverulent form.

By the expression "thermoplastic-elastomer" as herein employed is meant an elastomeric material which is characterized by having thermoplastic properties and by having a softening temperature maximum of no greater than about 233° C. The thermoplastic elastomer most suitable are those known in the art as A-B-A block copolymers in which A designates a thermoplastic block and B designates an elastomeric or rubbery block. The expression "A-B-A block copolymer" is intended to embrace all variations of block copolymers with rubbery midblocks and thermoplastic endblocks, i.e., linear, branched or radial. It is intended to embrace copolymers sometimes designated A-B-C block copolymer in which C is also a thermoplastic endblock but of a different polymer than A. It is also intended to embrace radial block or teleblock copolymers which may be designated (A-B)$_n$-X wherein X is an organic or inorganic polyfunctional atom or molecule, n is an integer corresponding in value to the functional group originally present in X, and in which each (A-B)— radiates from X in a way that A is an endblock. The A-B-A block copolymer may be modified by a minor proportion (up to equal proportion) of an A-B block copolymer. The expression "A-B" block copolymer refers to a "simple block copolymer" in which B forms one endblock rather than a midblock.

The thermoplastic "A" block is generally a polymer of alkenylarenes, preferably of styrene or styrene homologs and analogs such as α-methylstyrene, 4-tertiarybutylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene, 4-dodecylstyrene, vinyltoluene and the like.

The rubbery "B" block is a polymer of a conjugated aliphatic diene of from 4 to 6 carbon atoms. Suitable conjugated dienes include butadiene, isoprene, 1,3-pentadiene, 1,3-hexadiene, 2,3-dimethylbutadiene and the like. The preferred diene is isoprene.

In the suitable block copolymers, the individual "A" block portion has a number average molecular weight of at least 6,000, preferably in the range of from about 8,000 to 30,000, and the "B" block portion has a number average molecular weight preferably in the range of from about 45,000 to about 180,000. The "A" blocks constitute from about 5 to about 50 percent, preferably about 10 to about 30 percent by weight of the block copolymer. The number average molecular weight of the block copolymers suitable for the practice of the present invention are those in the range of about 75,000 to 200,000 for linear copolymers and about 125,000 to 400,000 for radial copolymers. Preferably, they are in the range of 100,000 to 150,000 for linear and 150,000 to 250,000 for radial. In the A-B copolymers, the number average molecular weight of the A blocks should be from about 7,000 to about 20,000, while the total molecular weight generally should not exceed about 150,000.

Suitable thermoplastic-elastomeric block copolymers are prepared by stepwise solution polymerization of the components. The preparations and properties of block copolymers are amply described in the literature such as, for example, "Thermoplastic Rubber (A-B-A Block Copolymers) in Adhesives" by J. T. Harlan et al., in "Handbook of Adhesives" edited by Irving Skeist, Van Nostrand Reinhold Co., New York, Second Edition (1977), pages 304–330; "Rubber-Related Polymers, I. Thermoplastic Elastomers" by W. R. Hendricks et al., in "Rubber Technology" edited by Maurice Morton, Van Nostrand Reinhold Co., New York (1973), pages 515–533; and U.S. Pat. Nos. 3,519,585; 3,787,531; and 3,281,383; and for A-B block copolymers, U.S. Pat. Nos. 3,519,585 and 3,787,531. The block copolymers are also available commercially.

When the "A" block is polystyrene and the "B" block is a polymer of butadiene in an A-B-A type block copolymer, the polymer is frequently referred to as a S-B-S polymer, and when the "A" block is a styrene polymer and the "B" block is an isoprene polymer, the polymer is frequently referred to as a S-I-S polymer.

The preferred polymer is an S-I-S polymer available commercially in the linear form as Kraton ® 1107 from Shell Chemical Company and in the radial form as Solprene ® 420 from Phillips Petroleum Company. Other block copolymers, less preferred or usable as minor component and available commercially include Kraton ® 1102 (linear S-B-S), Solprene ® 311 (S-I), and Solprene ® 1205 (S-B).

In a separate operation simultaneous with or sequential to the foregoing, an appropriate tackifying resin as hereinafter defined is comminuted or diced also to a particle size small enough to pass through a 100 mesh screen to obtain a pulverulent tackifier. In carrying out this step, it is desirable to chill the resin to counteract the heat generated in the comminuting process and to prevent agglomeration of the resin powder. This is particularly desirable if the resin has a low melting point.

A tackifying resin for the tackifier component may be any solid tackifying resin conventional for pressure-sensitive adhesives. By "solid tackifying resin" as herein employed is meant any natural or synthetic substantially water-insoluble polymer material having a softening point within a range of about 85° C. to about 150° C. which when mixed with the elastomeric component provides a composition which will adhere to a surface on application of light finger pressure and have sufficient internal strength so that it can be removed from the surface to which it had been adhered without substantial portions of the adhesive mass separating from the main adhesive mass and remaining on the surface. Conventional tackifying resins include rosin, rosin derivatives, polymerized α or β-pinene, or other polyterpine, and polymerized mixture of piperylene and isoprene. Also useful are poly(α-methyl)styrene-vinyltoluene, coumarone-indene polymers, styrene-maleic acid copolymers, chlorinated biphenyls, phenolic resins and the like. Rosin derivatives include hydrogenated rosin, dehydrogenated rosin, maleic acid modified rosin and rosin esters, especially pentaerythritol and glycerol esters of hydrogenated rosin. Other suitable materials are those which exhibit the proper balance of properties in the "quickstick", adhesion and cohesion strength tests described in the chapter entitled "Pressure-Sensitive Tapes and Labels" by C. W. Bemmels in "Handbook of Adhesives" edited by Irving Skeist, Van Nostrand, Reinhold Company, (1977), pp. 724–735.

The next step is the blending step. After the elastomer and tackifier are in the appropriate powder state, an appropriate amount of each component and other materials, if employed, also in a suitable pulverulent state, are blended together to obtain a powder blend of an adhesive composition. The blending may be carried out at ambient temperature; however, it is preferably carried out with cooling to prevent sticking or agglomeration of the powder mixture caused by heat of blending. This is particularly desirable if the resin selected has a softening point which is close to the minimum. The cooling may be achieved in any manner, e.g. cooling chamber, cold room, etc. The blending is carried out employing any means suitable for blending powder such as a powder blender and for time sufficient to assure thorough blending.

The relative amount of elastomer component and tackifier component to be employed ranges from about 50 to about 125 parts by weight of the tackifier conponent to 100 parts by weight of the elastomer. When the elastomer is a S-I-S block copolymer, any of the conventional tackifying resins may be employed within the foregoing range. When the elastomer is a S-B-S block copolymer, it is preferable to use a rosin ester or mixed olefin, generally a terpolymer, tackifying resin.

The next step is the coating step. The powder adhesive composition thus obtained may be applied directly onto a substrate by any of the standard powder coating techniques or by an indirect method if the substrate is heat sensitive. In coating the substrate with a powder composition, a sufficiency of adhesive powder is supplied to provide an adhesive film of coating weight of from about 0.5 to 4.0 ounces per square yard.

Suitable direct coating techniques include electrostatic spraying, clearance coating, and the like. These techniques may be employed for coating cloth, paper, foil or non-heat sensitive film backings. Non-heat sensitive films are represented by polyimide, polyester and polytetrafluoroethylene films.

If the backing is heat sensitive, the adhesive powder can be applied to a carrier paper such as silicone release paper, then fused and transferred through a lamination step to any suitable heat sensitive backing such as thermoplastic films, or porous backing such as woven cloth backing. Heat sensitive films, to which the technique may be applied include polyethylene, polypropylene, vinyl chloride films and the like. Porous structures which should be coated by laminating and transfer include woven cloths, unimpregnated papers or unimpregnated non-woven cloths.

After the coating step, the coated substrate is fluxed. It is carried out by heating to a temperature of at least about 177° C. until the powder particles melt into a union with each other to form a homogenous liquid coating.

The coated substrate is then allowed to cool to room temperature to obtain an adhesive coated substrate.

The following examples illustrate the invention but are not to be construed as limiting.

EXAMPLE I

A S-I-S block copolymer (Shell Kraton ® 1107) in an amount of 100 parts by weight is added to a dicer containing liquid nitrogen and the particles diced to fineness capable of passing a 60 mesh standard sieve and thereafter recovered from the dicer. A piperylene/isoprene tackifying resin (m. p. 95° C., Goodyear Wingtack 95) in an amount of 100 parts is pulverized until of a 60 mesh particle size. (In this and subsequent examples, it is to be understood that m. p. refers to softening point.) The S-I-S block copolymer and tackifier resin together with 2 parts by weight of antioxidant, zinc dibutyl dithiocarbamate and 0.5 part by weight of 2,5-ditertiary amylhydroquinone are blended together at ambient temperature until homogenous.

The free flowing dry powder comprising a pressure-sensitive adhesive composition is employed to coat a cloth substrate with a clearance coater (a Bird applicator having a fixed opening). The coated cloth substrate is then exposed to a temperature of about 205° C. for about 30 seconds whereupon the powder melts to form a uniform molten coating of pressure-sensitive adhesive on the substrate which when allowed to cool forms a film at about 3.5 ounces per square yard.

The adhesive coated substrate after slitting into tapes and tested for quickstick, anchorage, adhesive strength (adhesion to steel), and 20° hold to chrome show pressure-sensitive adhesive properties comparable to tapes coated with adhesives prepared and applied by solvent coating or extrusion.

EXAMPLE II

A S-B-S block copolymer (Shell Kraton ® 1102) in an amount of 50 parts by weight and a S-I-S block copolymer (Kraton ® 1107) in an amount of 50 parts are added to a liquid nitrogen containing dicer and pulverized to an approximately 60 standard sieve mesh size. A piperylene/isoprene tackifying resin (softening point 76° C., Goodyear Wingtack ® 76) in an amount of about 100 parts is pulverized to an approximately 60 mesh particle size. The elastomer powder and tackifying resin powder together with 2 parts by weight of zinc dibutyl dithiocarbamate and 0.5 part by weight of 2,5-ditertiary amylhydroquinone are blended together, the blend dry coated on a cloth substrate, and the coated substrate heated to 205° C. for thirty seconds, then allowed to cool to obtain a pressure-sensitive adhesive coated cloth having an adhesive film at about 3.5 ounces per square yard.

EXAMPLES III–VI

The examples in Table A illustrate various compositions which are suitable for the preparation of pressure-sensitive adhesives employing the process of the present invention which includes the steps of pulverizing the elastomer below minus 20° C. to a fineness to pass through a 60 mesh screen, blending the elastomer with tackifier and other components similarly pulverized to obtain a powder composition of a pressure-sensitive adhesive.

TABLE A

| | Amount of Components (Parts by Weight) Examples | | | |
|---|---|---|---|---|
| Component | III | IV | V | VI |
| Elastomer | | | | |
| S-I-S, linear (Kraton ® 1107) | 100 | — | 50 | 50 |
| S-B-S, linear (Kraton ® 1102) | — | 50 | — | — |
| S-I-S, radial (Solprene ® 424) | — | 50 | — | — |
| S-I (Solprene ® 311) | — | — | 50 | — |
| S-B (Solprene ® 1205) | — | — | — | 50 |
| Tackifier | | | | |
| Polymerized piperylene/isoprene, m.p. 95° C. (Wingtack ® 95) | — | — | 100 | — |
| Polymerized β-pinene, m.p. 115° C. (Piccolyte ® 115) | 60 | — | — | — |
| Pentaerythritol ester of stabilized rosin, m.p. 105° C. (Foral ® 105) | — | — | — | 80 |
| Polymerized mixed olefins, m.p. 100° C. (Super Statac 100) | — | 80 | — | — |
| Zinc dibutyl dithiocarbamate | 2 | 2 | 2 | 2 |
| 2,5-Ditertiary amylhydroquinone | 0.5 | 0.5 | 0.5 | 0.5 |

The compositions are coated on paper (Example III and IV) and polyester film (Examples V and VI) substrates in a manner similar to that described in Examples I and II to obtain adhesive coated substrates which are appropriate for slitting into tapes.

I claim:

1. A process for making a pressure-sensitive adhesive coated product comprising:
    (a) cooling a thermoplastic elastomer to below minus 20° C. and pulverizing the cool polymer to a size sufficiently fine to pass through a 60 mesh screen to obtain an elastomer powder, said elastomer being an A-B-A block copolymer having a softening temperature maximum of no greater than about 233° C.,
(b) pulverizing a tackifying resin of softening point in the range of about 85° C. to about 150° C. to a size sufficiently fine to pass through a 60 mesh screen to obtain a tackifier powder,
(c) dry blending at ambient temperature or below, said tackifier powder and elastomer powder in a weight ratio of about 50 to about 125 parts of tackifier powder to 100 parts of elastomer powder to obtain a blend of powders,
(d) dry coating said powder blend onto the surface of a substrate,
(e) heating the powder coated substrate to a temperature of at least about 177° C. until the powder particles melt into union with each other to form a homogeneous molten coating, and
(f) allowing to cool to ambient temperature.

2. A process according to claim 1 in which the thermoplastic elastomer is a (polystyrene-polyisoprene-polystyrene) or S-I-S block copolymer.

3. A process according to claim 1 in which the thermoplastic elastomer is cooled and pulverized in liquid nitrogen.

4. A process according to claim 1 in which the tackifier resin is selected from the group consisting of rosin, rosin derivatives, polymerized α- or β-pinene, polyterpene, and polymerized mixture of piperylene and isoprene.

5. A process for making a pressure-sensitive adhesive tape comprising:
(a) cooling a thermoplastic elastomer to below minus 20° C. and pulverizing the cool polymer to a size sufficiently fine to pass through a 60 mesh screen to obtain an elastomer powder, said elastomer being an A-B-A block copolymer having a softening temperature maximum of no greater than about 233° C.,
(b) pulverizing a tackifying resin of softening point in the range of about 85° C. to about 150° C. to a size sufficiently fine to pass through a 60 mesh screen to obtain a tackifier powder,
(c) dry blending at ambient temperature or below, said tackifier powder and elastomer powder in a weight ratio of about 50 to about 125 parts of tackifier powder to 100 parts of elastomer powder to obtain a blend of powders,
(d) dry coating said powder blend onto the surface of a sheet of heat-insensitive tape backing as substrate,
(e) heating the powder coated substrate to a temperature of at least about 177° C. until the powder particles melt into union with each other to form a homogeneous molten coating, and
(f) allowing to cool to ambient temperature.

6. A process for making pressure-sensitive adhesive tape comprising:
(a) cooling a thermoplastic elastomer to below minus 20° C. and pulverizing the cool polymer to a size sufficiently fine to pass through a 60 mesh screen to obtain an elastomer powder, said elastomer being an A-B-A block copolymer having a softening temperature maximum of no greater than about 233° C.,
(b) pulverizing a tackifying resin of softening point in the range of about 85° C. to about 150° C. to a size sufficiently fine to pass through a 60 mesh screen to obtain a tackifier powder,
(c) dry blending at ambient temperature or below, said tackifier powder and elastomer powder in a weight ratio of about 50 to about 125 parts of tackifier powder to 100 parts of elastomer powder to obtain a blend of powders,
(d) dry coating said powder blend onto the surface of a temporary substrate of carrier paper,
(e) heating the powder coated substrate to a temperature of at least about 177° C. until the powder particles melt into union with each other to form a homogeneous molten coating,
(f) allowing to cool to ambient temperature to obtain an adhesive film, and
(g) transferring the adhesive to a heat-sensitive or porous tape backing.

* * * * *